Samuel D. Morrison, Dennis A. Morrison, and Joseph B. Morrison.
Plow.
No. 117801. Patented Aug 8 1871.
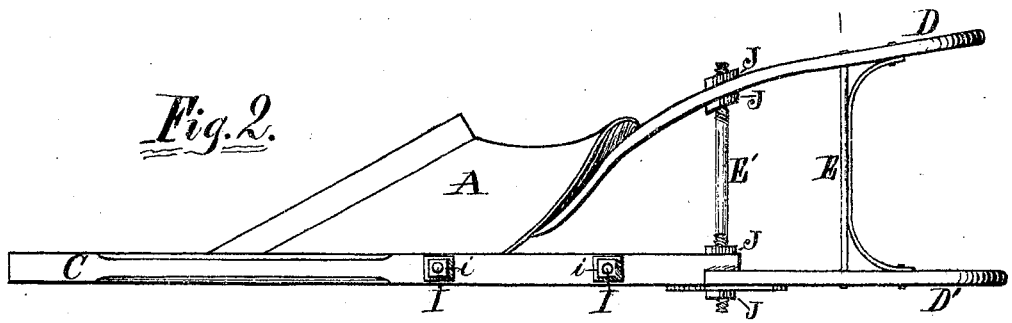
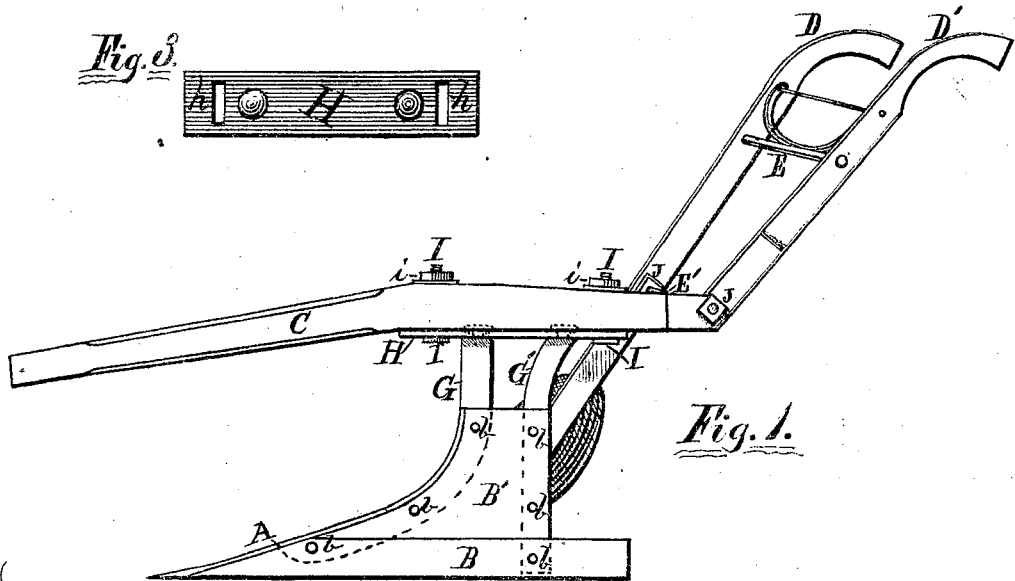
Witnesses:
J. J. Tunnicliff.
Wm Thomas.
Inventors,
Samuel B. Morrison,
Dennis A. Morrison,
& Joseph B. Morrison,
by W. B. Richards
their Atty.

117,801

UNITED STATES PATENT OFFICE.

SAMUEL D. MORRISON, DENNIS A. MORRISON, AND JOSEPH B. MORRISON, OF FORT MADISON, IOWA.

IMPROVEMENT IN PLOWS.

Specification forming part of Letters Patent No. 117,801, dated August 8, 1871.

*To all whom it may concern:*

Be it known that we, SAMUEL D. MORRISON, DENNIS A. MORRISON, and JOSEPH B. MORRISON, of Fort Madison, in the county of Lee and State of Iowa, have invented certain Improvements in Plows, of which the following is a specification:

The nature of our invention relates to improvements in plows; and the invention consists in the arrangement of devices for connecting the beam to the land-side so as to allow of adjusting the forward end of the beam laterally, all as hereinafter fully described.

Figure 1 is a side elevation of a plow embodying our invention. Fig. 2 is a top view of Fig. 1. Fig. 3 is a detached view of the plate H, Fig. 1.

A is the mold-board, which may be constructed in any of the ordinary styles. B is the land-side, constructed and attached to the mold-board A in the usual manner, with an elevated front, B', constituting what is generally known as a "high land-side." C is the plow-beam. D D' are the handles. E E' are the stay-rods connecting the handles D D'. G G' are the standards attached to the land-side B B' by bolts $b\ b\ b\ b\ b$. H is a plate, a top view of which is shown at Fig. 3, with slots $h\ h$. The upper ends of the standards G G' are riveted in the plate H. I I are bolts passing through the slots $h\ h$ and beams C, and having nuts $i\ i$ on their upper ends. J J J are nuts running on threaded parts of the rod E', as shown.

The lower end of the handle D', between the beam C and land-side B, is dispensed with, and is attached at its lower end to the rear end of the beam C, as shown in the drawing. This construction will prevent the difficulties arising from the soil, stubble, &c., clogging on the lower end of said handle as usually constructed, which must be frequently removed or else allowed to remain, increasing the draft and interfering with the steady running of the plow.

By tightening up the nuts $i\ i$ the working parts of the plow may be held securely to the beam C. By loosening the nuts $i\ i$ the bolts I I may be slid freely in the lateral slots $h\ h$ in the plate H, and thereby permit of the plow-beam being adjusted laterally to run the plow to or from the land, as required, at the same time turning the nuts J J J on the rod E to adjust it to the change of position of the beam C.

We claim—

The arrangement of beam C and handles D D' with slotted plate H, standards G G', bolts I I, rod E, and nuts J J J, constructed and operating substantially as and for the purpose specified.

SAMUEL D. MORRISON.
DENNIS A. MORRISON.
JOSEPH B. MORRISON.

Witnesses:
A. B. HAMPTON,
GEO. J. KENNEDY.